UNITED STATES PATENT OFFICE 2,162,035

RESINOUS COMPOSITION AND PROCESS OF MAKING SAME

Fritz Seebach, Erkner, near Berlin, Germany, assignor to Bakelite Corporation, New York, N. Y., a corporation of Delaware No Drawing. Application September 30, 1936, Serial No. 103,355. In Germany October 14, 1935

6 Claims. (Cl. 260—59)

The preparation of molded articles from phenol-aldehyde resins of the heat-hardening and fusible type is generally accomplished by mixing the resins with filler until a highly homogeneous condition is reached, and these compositions, after the addition of dyes, lubricants, plasticizers, etc., are molded and hardened under the simultaneous action of pressure and heat. Without the addition of organic or inorganic fillers such as wood flour, asbestos, etc., the hardenable and fusible phenol-aldehyde resins do not lend themselves to molding in a hot press since fusible resins exude from a mold and consequently usable molded articles are not formed. Accordingly, for the preparation of molded articles from phenol-aldehyde resins without fillers they are converted in some manner to a non-fusible yet plastic (resitole) state and then molded under the application of heat and pressure. This procedure, however, renders the molding difficult in that the flow of plastic non-fusible resitoles is comparatively sluggish so that in the manufacture of numerous articles which require an appreciable flow of the resin during molding, resitoles are impossible to use.

The present invention has for its basis the surprising observation that fusible hardenable phenol-aldehyde resins can be made into moldable resins of excellent workability and good flow without changing them into the above-described resitole state. The invention comprises the advancement by heating of a hardenable and fusible phenol-aldehyde resin to a point approaching the resitole condition; in this stage the resins are soluble in ethyl alcohol and acetone and show such a high melting point, for instance 90–100° C., that in an attempt to fuse them they are readily converted into resitoles. The moldable resins prepared according to my invention can therefore be converted into resitoles by heating them to about 150° C. for ½–1 minute only. The advancement of the fusible resin by heating to the desired point is preferably carried out by treating the resin on heated rolls or in a heated kneading machine. Simultaneous action of heat and pressure may also be used. I prefer to use as starting material hardenable and fusible resins having high melting points, such as 70° C. or higher; also it is preferable that the resins be dehydrated as much as possible to a moisture content of 1 to 2% or less. Resin compositions of novolaks and hardening agents such as hexamethylenetetramine or anhydro-formaniline are in particular suitable for this invention; but heat-hardening fusible resins prepared directly from phenols and aldehydes (resoles) can also be used. Likewise there can be used derivatives of non-hardening or hardening resins as for example partially acetylated novolaks to which hardening agents are added, resins obtained by condensing phenol, China wood oil or oxidized castor oil and formaldehyde, resoles combined with fatty oils in the presence of solvents such as cyclohexanol, etc.

As an illustration a resin that is moldable without any added filler is prepared from 2 kilograms of a novolak (having a melting point of about 70° C. and made in the customary manner from a phenol and formaldehyde with an acid catalyst) by grinding in a mill with 0.3 kilo of hexamethylenetetramine, and passing the mixture after an addition of 25 grams of stearic acid between rolls heated to about 100° C. Before or during rolling it may be advisable to moisten the mixture with water say from 10–30% by weight of the mixture, as this facilitates the formation of a homogeneous product of novolak and hardening agent by the rolls. The rolls should be heated to such a degree that the mixture fuses but not enough to run off the rolls. As soon as a homogeneous mixture has been formed, the sheeted mixture is removed from the rolls and placed in a drying chamber heated to about 70 to 80° C., for about 2 to 4 hours. The temperature in the drying chamber is regulated so that the resin softens but does not fuse. By the foregoing treatment on the rolls the melting point of the resin is advanced about 10 to 30 degrees; but the resin is still in the resole state and is in that state when taken from the drying oven. It can be ground or crushed, and it is then milled on rolls heated to about 100 to 110° C.; preferably the resin should, however, be moistened with water before it is rolled. The resin should be removed from the rolls before it reaches the resitole stage. In this form the resin can be molded under heat and pressure without added filler to give molded articles of practically any shape and dimension.

The preparation of a molding resin from a resole is accomplished in substantially the same manner. It has been found that a small quantity of aniline hydrochloride during the treatment of a resole is of advantage since it facilitates maintaining the resin in the soluble condition. For example, 1 kilo of a heat-hardening resin, i. e. a resole, prepared from phenol or cresol and formaldehyde with ammonia as a catalyst, is fused with 1 to 5% by weight of aniline hydrochloride on the heated rolls; the process is otherwise the same as described above in connection with the formation of molding resins from novolaks and hardening agents. In this case a resin can be obtained that approaches the resitole condition but without losing its solubility in ethyl alcohol and acetone, and it is well adapted for the manufacture of molded articles without necessitating the addition of a filler.

Aniline hydrochloride can also be included in moldable resins prepared from novolaks and hardening agents.

In carrying out my invention mixtures of resoles and novolaks may also be used. I mix, for example, 70 kilos of a novolak melting at 70° C., with 30 kilos of a resole melting at 65° C. and heat the mixture to about 150° C. until a homogeneous composition having a high melting point, such as 100-120° C. is obtained. This composition is mixed with 12 kilos of hexamethylenetetramine and heated as described hereinbefore.

Resins that are moldable without the addition of a filler can also be obtained by modifications of the process described. For instance the oven treatment can be omitted. As an example a novolak is prepared from 33 parts of phenol and 28 parts of formaldehyde (40% solution) in the presence of 0.1 part of hydrochloric acid as a catalyst, and the resin is dehydrated; the melting point is approximately 70° C. A charge of 500 parts of the resin is mixed with 75 parts of hexamethylenetetramine and 6 parts of stearic acid and fused to a homogeneous mass preferably in a kneader, though this operation can be carried out on the rolls as in the previously described process; about 12 parts of water and 6 parts of a plasticizer such as ethylene glycol diacetate are also included by preference. The composition is then treated on the rolls heated to about 110° C. and the milling is continued until the desired condition is reached; during the rolling it may be desirable to add further small quantities of water and plasticizer. Other suitable plasticizers include diethylphthalate, toluene sulfonamide, methyl-ethyl-phthalyl glycolate, etc.

The resins prepared according to this invention can be molded in the usual manner under heat and pressure. As the resins are in a condition approaching the resitole state lower molding pressures than normal may be required, and the preferred molding temperatures lie within 160 to 170° C. Before molding the resins can be subjected to various treatments such as drying in a current of hot air or under a vacuum.

What I claim is:

1. Process of preparing a resin having a plastic flow under the action of heat and pressure so as to be moldable into a coherent article without the addition of a filler and without undue exudation which comprises passing a phenol-aldehyde resin of novolak type melting at about 70° C. or higher with hexamethylenetetramine as a hardening agent and from 10 to 30 per cent by weight of the mixture of water through rolls heated at about 110° C. to form a homogeneous heat-hardening product reacted to a melting point advanced about 10 to 30 degrees while retaining solubility in ethyl alcohol or acetone, drying, and again milling the product but removing the product before the resitole stage of insolubility is reached.

2. Process of preparing a resin having a plastic flow under the action of heat and pressure so as to be moldable into a coherent article without the addition of a filler and without undue exudation which comprises preparing a heat-hardening phenol-aldehyde resin having a melting point of about 70° C. or higher, and advancing the resin while retaining solubility in ethyl alcohol or acetone by heating and mechanically working by rolling in the presence of water to a homogeneous sheeted condition but removing the product before the resitole stage of insolubility is reached.

3. Process of preparing a resin having a plastic flow under the action of heat and pressure so as to be moldable into a coherent article without the addition of a filler and without undue exudation which comprises preparing a heat-hardening phenol-aldehyde resin having a melting point of about 70° C. or higher, and advancing the resin while retaining solubility in ethyl alcohol or acetone by heating and mechanically working by rolling in the presence of water and ethylene glycol diacetate as a plasticizer to a homogeneous sheeted condition but removing the product before the resitole stage of insolubility is reached.

4. Process of preparing a resin having a plastic flow under the action of heat and pressure so as to be moldable into a coherent article without the addition of a filler and without undue exudation which comprises advancing a heat-hardening phenol-aldehyde resin having a melting point of 70° C. or higher by milling on hot rolls into a homogeneous sheet while retaining solubility in ethyl alcohol or acetone and removing the product before the resitole stage of insolubility is reached.

5. Process of preparing a resin having a plastic flow under the action of heat and pressure so as to be moldable into a coherent article without the addition of a filler and without undue exudation which comprises advancing a heat-hardening phenol aldehyde resin having a melting point of 70° C. or higher by milling in the presence of water on rolls heated to a temperature to cause softening without running of the resin until a homogeneous sheet is produced approaching the resitole condition and retaining solubility in ethyl alcohol or acetone.

6. A resinous composition consisting essentially of a fusible and heat-hardenable phenol-aldehyde resin soluble in ethyl alcohol and in acetone and having a plastic flow such that it can be molded under the action of heat and pressure to a coherent article without addition of filler and without material exudation from the mold, said resinous composition being produced by advancing the melting point of a phenol-aldehyde resole, having an initial melting point of at least 70° C., by from about 10 to about 30 degrees by mechanically working the same under the controlled influence of heat and pressure, said working having been discontinued prior to conversion of the resole into a resitole.

FRITZ SEEBACH.